United States Patent
Chen et al.

(10) Patent No.: US 8,771,381 B2
(45) Date of Patent: Jul. 8, 2014

(54) PROCESS FOR PRODUCING ELECTROLYTIC CAPACITORS AND CAPACITORS MADE THEREBY

(75) Inventors: Qingping Chen, Simpsonville, SC (US); Hong Zhang, Jiangsu (CN); Antony P. Chacko, Simpsonville, SC (US); Philip M. Lessner, Simpsonville, SC (US); Randolph S. Hahn, Simpsonville, SC (US); Yongjian Qiu, Simpsonville, SC (US); Keith R. Brenneman, Simpsonville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 286 days.

(21) Appl. No.: 13/396,793

(22) Filed: Feb. 15, 2012

(65) Prior Publication Data

US 2012/0206860 A1    Aug. 16, 2012

Related U.S. Application Data

(60) Provisional application No. 61/443,051, filed on Feb. 15, 2011, provisional application No. 61/443,622, filed on Feb. 16, 2011.

(51) Int. Cl.
| | |
|---|---|
| *H01G 9/00* | (2006.01) |
| *H01G 9/15* | (2006.01) |
| *H01G 9/028* | (2006.01) |
| *H01G 9/052* | (2006.01) |

(52) U.S. Cl.
CPC ............... *H01G 9/028* (2013.01); *H01G 9/15* (2013.01); *H01G 9/0036* (2013.01); *H01G 9/052* (2013.01)
USPC .................................................... 29/25.03

(58) Field of Classification Search
None
See application file for complete search history.

(56) References Cited

U.S. PATENT DOCUMENTS

| | | |
|---|---|---|
| 2,914,504 A | 11/1959 | Metzger et al. |
| 4,812,506 A | 3/1989 | Gilmer et al. |
| 5,356,670 A | 10/1994 | Briggs et al. |
| 7,348,029 B2 * | 3/2008 | Kliss et al. ............. 424/490 |
| 7,563,290 B2 | 7/2009 | Qiu et al. |
| 7,658,986 B2 | 2/2010 | Poltorak et al. |

FOREIGN PATENT DOCUMENTS

WO    2010/089111    8/2010

OTHER PUBLICATIONS

Yeo, In Hong; Patent Cooperation Treaty Written Opinion of the International Searching Authority; Korean Intellectual Property Office; Sep. 24, 2012.
Yeo, In Hong, International Search Report and Written Opinion of the International Searching Authority; Int. Application No. PCT/US2012/025238; Feb. 15, 2012.

\* cited by examiner

*Primary Examiner* — Seahvosh Nikmanesh
(74) *Attorney, Agent, or Firm* — Joseph T. Guy; Perkins Law Firm, LLC

(57) ABSTRACT

A process for preparing a solid electrolytic capacitor comprising application of a non-ionic polyol prior to application of a conducting polymer layer.

21 Claims, 4 Drawing Sheets

PROCESS FOR PRODUCING ELECTROLYTIC CAPACITORS AND CAPACITORS MADE THEREBY

CROSS-REFERENCE TO RELATED APPLICATIONS

The present application claims priority to U.S. Provisional Patent Appl. No. 61/443,051 filed Feb. 15, 2011 and to U.S. Provisional Patent Appl. No. 61/443,622 filed Feb. 16, 2011 both of which are incorporated herein by reference.

BACKGROUND

The present invention is related to an improved method of forming a solid electrolyte capacitor and an improved capacitor formed thereby. More specifically, the present invention is related to materials and methods for improving corner and edge coverage of solid electrolytic capacitors. The invention also discloses methods for manufacturing the same.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials that includes manganese dioxide or electrically conductive organic materials such as polyaniline, polypyrrole, polythiophene and their derivatives. Solid electrolytic capacitors with intrinsically conductive polymers as the cathode material have been widely used in the electronic industry due to their advantageously low equivalent series resistance (ESR) and "non-burning/non-ignition" failure mode. In the case of conductive polymer cathodes the conductive polymer is typically applied by either chemical oxidation polymerization, electrochemical oxidation polymerization or spray techniques with other less desirable techniques being reported.

The backbone of a conductive polymer consists of a conjugated bonding structure. The polymer can exist in two general states, an undoped, non-conductive state, and a doped, conductive state. In the doped state, the polymer is conductive, due to a high degree of conjugation along the polymer chain and the presence of charges generated by doping, but has poor processability. In its undoped form, the same polymer loses its conductivity but can be processed more easily because it is more soluble. When doped, the polymer incorporates counter ionic moieties as constituents on its charged backbone. In order to achieve high conductivity, the conductive polymers used in the capacitor must be in doped form after the completion of the process, although during the process, the polymer can be undoped/doped to achieve certain process advantages.

Various types of conductive polymers including polypyrrole, polyaniline, and polythiophene are applied to the solid electrolytic capacitors. The major drawback of conductive polymer capacitors, regardless of the types of conductive polymers employed, is their relatively low working voltage compared to their wet electrolytic counterparts. For tantalum solid electrolytic capacitors conductive polymer capacitors have lower working voltage limits than those based on $MnO_2$ as the solid cathode. The polymer capacitors have reliability issues, to varying degrees, when the voltage rating exceeds 25V. This is believed to be caused by the relatively poor dielectric-polymer interface, which has poor "self-healing" capability. The ability to withstand high voltage can be best characterized by the breakdown voltage (BDV) of the capacitors. Higher BDV corresponds with better reliability. For reasons which were previously unknown the break-down voltage of capacitors comprising conductive polymers has been limited to about 55V thereby leading to a capacitor which can only be rated for use at about 25V. This limitation has thwarted efforts to use conductive polymers more extensively.

U.S. Pat. No. 7,563,290, which is incorporated herein by reference, describes the slurry/dispersion process. The resulting capacitors show excellent high voltage performances, reduced DC leakage (DCL) and improved long term reliability.

It is highly desirable that the capacitor devices are of high reliability and that they can withstand stressful environments. Therefore, the integrity of the anodes and the robustness of conductive polymer cathodes are essential for high quality capacitor products. However, it is a challenge to form a conductive polymer coating on the anodes that is defect-free, and which is capable of withstanding thermal mechanical stress during anode resin encapsulation and surface-mounting. The improper application of polymer slurry often leads to the exposure of the dielectric and formation of cracks and delaminating of the polymer coating thus formed.

A particular concern is the formation of adequate polymer coatings on edges and corners. U.S. Pat. No. 7,658,986, which is incorporated herein by reference, describes the difficulty in coating the edges and corners of the anode with polymer slurry. These materials tend to pull away from the corners and edges due to surface energy effects. The resulting thin coverage at corners and edges leads to poor reliability of the device.

One approach to mitigating poor coverage of the anode corners and edges has been to alter the design of the anode as disclosed in U.S. Pat. Nos. 7,658,986, D616,388, D599,309, and D586,767 each of which is incorporated herein by reference. While changes in the anode design are beneficial in some regards the effect of poor coverage is still present even with anode designs which facilitate corner and edge coverage by polymer slurry as the primary cathode layer.

Another approach for improving coverage of the corners and edges is provided in International Application WO2010089111A1, which is incorporated herein by reference, which describes a group of chemical compounds called crosslinkers, which are mostly multi-cationic salts or multi-amines, such as an exemplary material linear aliphatic $\alpha,\omega$-diamines. International Application WO2010089111A1 teaches the application of a solution of the crosslinker on the anodes prior to the application of polymer slurry to achieve good polymer coverage on corners and edges of the anodes. The effectiveness of the crosslinker is attributed to the cross-linking ability of multi-cationic salts or multi-amines to the slurry/dispersion particles. While crosslinkers are advantageous for improving the coating coverage on corners and edges of the anodes, the addition of these crosslinkers, which are mostly ionic in nature, has the unintended consequences of degrading the humidity performance of finished capacitors under humid conditions.

Cross linkers, by definition, link one polymer chain to another thus tending to be part of the polymer system. While crosslinkers are advantageous in many applications, it is undesirable to have an ionic crosslinker react with the polymer chain and be part of the polymer chain. Ionic materials, especially low molecular weight ionic compounds or mobile ionic compounds, can diffuse through various cathode layers, especially under humid conditions, and can cause higher leakage current. Unlike covalently crosslinked molecules, ionically crosslinked molecules, have lower bond strength and can be disassociated when exposed to high temperature and high humidity conditions. Once disassociated, these mobile ions can cause higher leakage current. So a need exists for materials and methods which improves corner and edge coverage while not crosslinking with the polymer system or increasing the ionic content of the capacitor.

SUMMARY OF THE INVENTION

It is an object of the invention to provide an improved solid electrolytic capacitor.

It is an object of the invention to provide an improved method of preparing a solid electrolytic capacitor cathode with good corner and edge coverage.

It has now been found that, surprisingly, corner and edge coverage can be improved using non-ionic polyols as a pre-coat prior to formation of the conductive polymeric cathode layer from conductive polymer slurry.

These and other advantages, as will be realized, are provided in a process for forming a solid electrolytic capacitor and an electrolytic capacitor formed by a process which includes:
providing an anode wherein the anode comprises a porous body and an anode wire extending from the porous body;
forming a dielectric on the porous body to form an anodized anode;
forming a solid cathode layer inside the pores of the anode;
applying a layer of non-ionic polyol on the solid cathode layer;
forming a conducting polymer layer on the non-ionic polyol layer; and
applying additional layers of non-ionic polyol and conducting polymer until a desired thickness of conducting polymer is obtained.

Yet another embodiment of the invention is provided in a method of forming an electrolytic capacitor comprising:
providing an anode with an anode lead extending therefrom;
forming a dielectric on the anode;
forming a conductive polymer layer on the layer of dielectric;
forming a layer of non-ionic polyol on the conductive polymer layer; and
forming a second conductive polymer layer on the layer of non-ionic polyol.

Yet another embodiment is provided in a capacitor with an anode and a dielectric on the anode. A conductive polymeric cathode is on the dielectric wherein the conductive polymeric cathode comprises a non-ionic polyol.

DESCRIPTION

The present invention is related to an improved capacitor and a method for making the improved capacitor. More particularly, provided herein is a method that allows the production of capacitors with improved corner and edge coverage.

The invention will be described with reference to the figures forming an integral, non-limiting, component of the disclosure. Throughout the various figures similar elements will be numbered accordingly.

Figure 1:
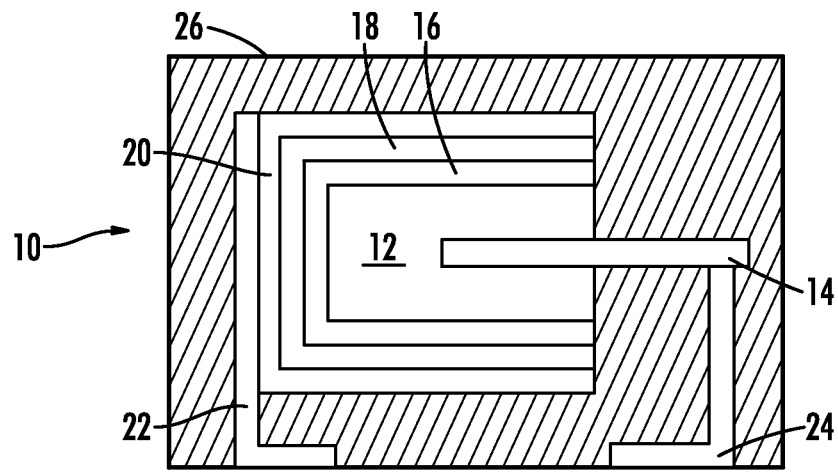
FIG. 1 schematically illustrates a capacitor in schematic cross-sectional view.

An embodiment of the invention is illustrated in schematic cross-sectional view in FIG. 1. In FIG. 1, a capacitor, generally represented at 10, comprises an anode, 12, with an anode wire, 14, extending therefrom. A dielectric, 16, is on the anode at least partially encasing the anode. A conductive polymeric cathode, 18, is on the dielectric and separated from the anode by the dielectric. Adhesion layers, 20, provide a layer which allows adhesion to a cathode external termination, 22. An anode external termination, 24, is in electrical contact with the anode wire. The entire capacitor, except for the lower portion of the anode and cathode external terminations, is preferably encased in a non-conductive matrix, 26 or sealed in a metal can as known in the art.

Figure 2:
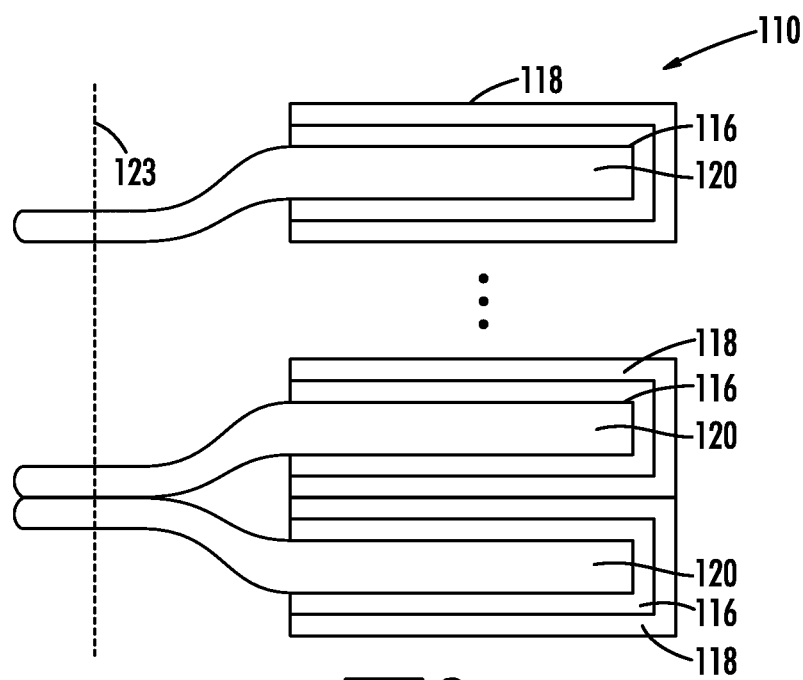
FIG. 2 schematically illustrates a capacitor in schematic cross-sectional view.

An embodiment of the invention is illustrated in FIG. 2 wherein a capacitor is generally represented at 110. A series of anodes, 120, are arranged in parallel fashion. Each anode has a dielectric, 116, thereon. A conductive polymer cathode, 118, is on each dielectric. The anodes are fused at 123 and the cathodes are commonly terminated.

The present invention provides a method for forming improved coating on the edges and corners through the use of a precoat of a non-ionic polyol prior to coating with a slurry of conductive polymer. The precoat may be prior to the first application of conductive polymer slurry or the first application of conductive polymer slurry may occur initially with non-ionic polyol applied between subsequent layers.

Figure 3:
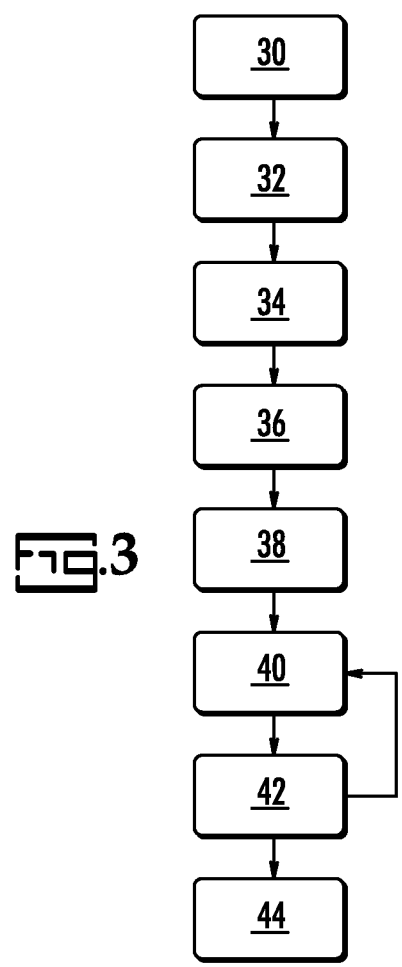
FIG. 3 illustrates a method of the claimed invention in flow chart representation.

An embodiment of the invention is illustrated in flow-chart form in FIG. 3. In FIG. 3, an anode is provided at 30. A dielectric is formed on the anode at 32. An initial coating of conductive polymer is formed at 34 preferably by in-situ chemical polymerization. A particularly preferred conductive polymer is poly 3,4-ethylenedioxythiophene (PEDT). PEDT can be made by in situ polymerization of ethylenedioxythiophene (EDT) monomer such as Clevios M V2 which is commercially available from Hereaeus with an oxidizer such as ferric tosylate solution available as Clevios® C from Hereaeus. In one embodiment the oxidizer is applied first by dipping following by dipping and drying in a monomer solution. An optional layer of nonionic polyol can be applied on the initial coating of conductive polymer at 36. A conductive polymeric coating is applied at 38 by dipping in a slurry of conductive polymer. To achieve the desired thickness of conductive polymer, sequential repeated steps of forming a non-ionic polyol layer at 40 is followed by forming a conductive polymeric layer at 42. The conductive polymeric layer is preferably formed by dipping in a slurry of conductive polymer. Once the desired thickness of conductive polymer is achieved the capacitor is finished at 44 by forming anodic and cathode external terminations and optionally encapsulating or sealing the capacitor.

Improvements in conductive polymeric coatings can be achieved, particularly on the edges and corners, by applying a coating of non-ionic polyol prior to formation of conductive polymeric coating. While not limited to any theory, it is hypothesized that the hydrophilic interaction between the multiple hydroxyl groups and the dispersed conductive particles will increase the viscosity of the coating layer when the solvent is evaporated during drying. The increased viscosity immobilizes the particles thereby mitigating the migration of material away from the edges and corners as typically occurs due to surface tension effects.

For the purposes of the present invention a non-ionic polyol is an alkyl alcohol with multiple hydroxyl groups or alkyl ethers with multiple hydroxyl groups on the alkyl groups.

The non-ionic polyol preferably has a melting point which is sufficiently high that the material remains in place as a solid coating yet lower than the drying temperature of the conductive polymer coating layer. During the drying of the conductive polymer layer the non-ionic polyol will melt and diffuse into the conductive polymer layer to eliminate the presence of a discrete non-ionic layer which would function as an insulating layer between the conductive polymer layers or conductive polymeric cathode and the dielectric. The melting point of the non-ionic polyol is preferable at least 50° C. to no more than 250° C. More preferably the melting point of the non-ionic polyol is at least 75° C. to no more than 200° C.

Preferred polyols comprise an alkyl or alkyl ether of 3-20 carbons, either linear, branched or in rings, with at least two carbons each substituted with at least one hydroxyl group. Each carbon may be otherwise unsubstituted or substituted with an alkyl of 1 to 5 carbons. When the alkyl or alkyl ether has lower than 3 carbons the polyol tends to be a liquid which is unsuitable. When the alkyl or alkyl ether has more than 20 carbons the solubility is impaired and the material approaches functioning as a polymer therefore becomes less effective.

Particularly preferred non-ionic polyols are $CH_2OH(CHOH)_2CH_2OH$ or erythritol, $CH_2OH(CHOH)_3CH_2OH$ as ribitol or xylitol, $CH_2OHC(CH_2OH)_2CH_2OH$ or pentaerythritol, $CH_2OHC(CH_3)_2CH_2OH$ or 2,2-dimethyl-1,3-propanediol; $CH_2OH(CHOH)_4CH_2OH$ or sorbitol, $CH_2OH(CHOH)_4CH_2OH$ or manitol, $CH_3C(CH_2OH)_3$ or trimethylolethane and $O(CH_2C(C_2H_5)CH_2OH)_2)_2$ or di-trimethylolpropane, $CH_2OH(CHOH)_4COH$ or glucose, $CH_2OH(CHOH)_3COCH_2OH$ or fructose, $C_{12}H_{22}O_{11}$ or sucrose or lactose.

Solid electrolytic capacitors generally comprise a porous metal anode, an oxide layer on the anode, typically an oxide of the anode metal, and an electrically conductive solid cathode, such as manganese dioxide or an intrinsically conductive polymer, incorporated into the pores and onto the dielectric. Additional layers, such as silver and carbon layers, are then added to aid in contact formation.

The solid electrolytic capacitors typically incorporate valve metals or conductive oxides of valve metals with tantalum, aluminum, niobium and niobium oxide being mentioned as particularly preferred. An advantage of the high surface area is that a very high capacitance can be achieved.

The dielectric is typically formed as an oxide of the anode metal without limit thereto. Dielectric formation is well documented in the art and the method of dielectric formation is not limited herein.

Conductive polymers are particularly suitable for use as the electrically conductive solid cathode with polyaniline, polypyrroles and polythiophenes being most preferred. A particularly preferred polymer for use as a cathode is polythiophene. The polymer layer inside the pores is preferably formed by chemical polymerization wherein the internal conductive layer is formed by dipping the anodized substrate first in a solution monomer of the conductive polymer. After a drying step, the anode bodies are then immersed in a solution comprising oxidizer and dopant. The chemical polymerization cycle can be repeated multiple times to achieve the desired coverage of the surface inside the pores. The polymer layer inside the pores can also be formed by dip coating using a solution or dispersion of conductive polymer. When a solution of conductive polymer such as polyaniline is utilized a diluted solution is preferred so that the solution viscosity would be sufficiently low to allow diffusion of the solution into the porous structure. In case of a dispersion of the conductive polymer the particle size must be sufficiently small to allow impregnation of the porous structure.

After the application of the internal conductive polymer layer, non-ionic polyol coating can be applied. The non-ionic polyol is preferably applied to the conductive polymer layer as a solution by dipping or by spraying. The non-ionic polyol can be selectively applied to the corners or edges. It is preferable that, at least, the edges and corners have polyol coated thereon. It is more practical to apply polyol to the entire outer surface of the capacitor body.

After the non-ionic polyol layer is formed a layer of conductive polymer can be applied with a slurry or dispersion of the conductive polymer. It is preferred to include a dopant in the polymer as known in the art. A particularly preferred dopant is the sodium salt of polystyrenesulfonate (PSS) or polyestersulfonate (PES).

The conducting polymer is preferably an intrinsically conducting polymer comprising repeating units of a monomer of Formula I:

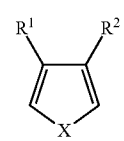

FORMULA I $R^1$ and $R^2$ of Formula I are preferably chosen to prohibit polymerization at the β-site of the ring. It is most preferred that only α-site polymerization be allowed to proceed. Therefore, it is preferred that $R^1$ and $R^2$ are not hydrogen. More preferably $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula I, X is S, Se or N. Most preferably X is S.

$R^1$ and $R^2$ independently represent linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$ taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl.

More preferably $R^1$ and $R^2$ independently represent —$CH_3$, —$CH_2CH_3$; —$OCH_3$; —$OCH_2CH_3$ or most preferably $R^1$ and $R^2$ are taken together to represent —$OCH_2CH_2O$— wherein the hydrogen can be replaced with a solubilizing group, a halide or an alkyl.

A solvent is defined as a single solvent or a mixture of solvents.

It is preferable to apply the dispersion comprising the conductive polymer at a pH of no more than 10 and more preferably no more than 8 with below 7 being more preferred and below 6 being especially preferred.

The conductive polymer dispersion is applied onto the polyol to form a layer that covers the edges and corners of the anodes. The application of non-ionic polyol layer and the conductive polymer layer can be repeated multiple times to achieve enough thickness. Without limit thereto 1-10 cycles of non-ionic polyol and conductive polymer layer application are suitable for demonstration of the invention. Each application of conductive polymer may use a unique composition and a unique solution or an identical or similar material may be used for the various dipping steps. A preferred thickness of the conductive polymer layer is at least 2 micrometers to no more than 50 micrometers. A more preferred thickness of the conductive polymer layer is from at least 2 micrometers to no more than 40 micrometers. An even more preferred thickness is from at least 3 micrometers to no more than 30 micrometers. If the layer of conductive polymer is below about 2 micrometers the dielectric is not adequately covered resulting in defective capacitors. If the conductive polymer layer is over about 50 micrometers the equivalent series resistance of the resulting capacitor is compromised.

In one embodiment a nanoparticle dispersion is applied after formation of the initial conductive polymer layer and after formation of subsequent conductive polymer layers. The nanoparticles may be used in combination with the non-ionic polyols or as a separate layer to enhance the formation of a layer that adequately covers the edges and corners of the anodes. The sequence of applying the nanoparticle dispersion material followed by applying a conductive polymer layer is repeated until the desired layer thickness is reached. Without limit thereto 2-10 cycles of the nanoparticle dispersion and conductive polymer layer application is suitable for demonstration of the invention. Nanoparticle dispersions comprise nanoparticles with the particle size of the nanoparticle of no more than 100 nm and more preferably no more than 50 nm. Nanoparticles of the nanoparticle dispersion are selected from aluminum oxide, zinc oxide, silicon oxide and cerium oxide. These nanoparticle dispersions are available from Byk Additives And Instruments under commercial name Nanobyk 3600 for aluminum oxide, Nanobyk 3810 for cerium oxide and Nanobyk 3820 for zinc oxide.

EXAMPLES

Inventive Example 1

Figure 4:
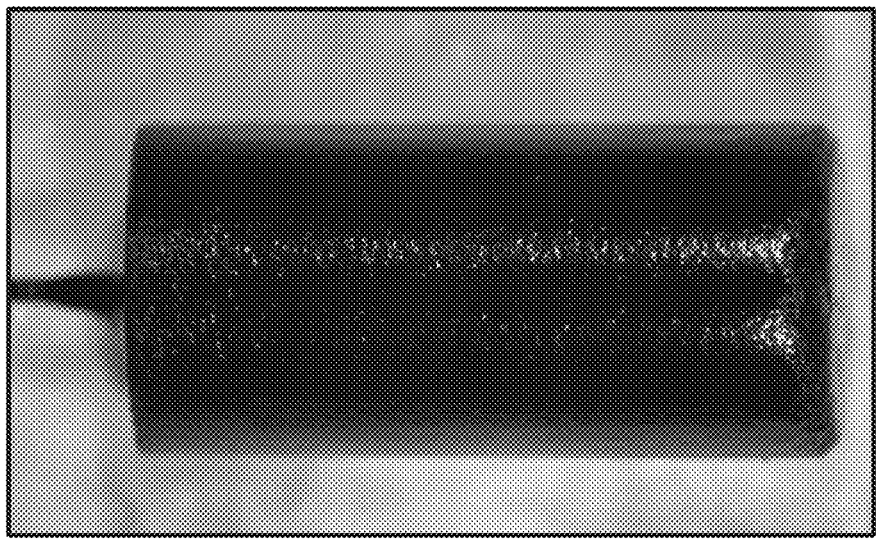
FIGS. 4-7 illustrate the advantages of the invention.

A series of tantalum anodes were prepared with a diameter of 5.2 mm and a length of 10.7 mm comprising a tantalum lead wire. Tantalum oxide dielectric was formed on the surface in accordance with the teachings of U.S. Pat. No. 5,716,511. The anodes with dielectric were immersed in a dilute PEDT dispersion with very small particle sizes, available as Clevios® Knano from Haraeus, for 1 minute and dried at 150° C. for 20 minutes. They were then dip-coated with 6% sorbitol solution in water and dried at 90° C. for 20 minutes. They were then dip-coated using a PEDT slurry, available as Clevios®K from Haraeus, to form an external polymer layer. The dip-coating with sorbitol solution followed by PEDT slurry dipping was repeated three more times. The optical photograph of the coated anode is provided in FIG. 4 wherein external anode coating covers the edges adequately.

Control Example 1

Figure 5:
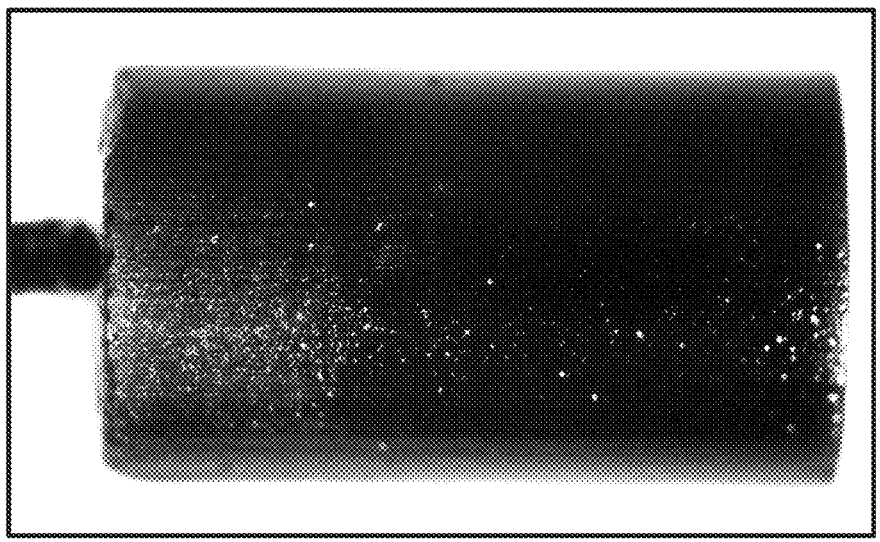

Anodes which were identical to those of Inventive Example 1 where coated in analogous fashion with the exception that the coating of sorbitol was deleted. The optical photograph of the anode is provided in FIG. 5 wherein the coverage of the top and bottom edges is poor with some exposed dielectric visible.

Inventive Example 2

Aluminum foil coupons with etched porous structure were anodically formed to 11 volts for a rated working voltage of 6.3 volts. They were immersed in a solution of ethylenedioxythiophene (EDT) in isopropanol. The isopropanol was evaporated at 40° C. for 2 minutes. The coupons were then dipped in an aqueous solution of ammonium persulfate (APS) with dispersed particles of sodium anthroquinone sulfonate (SAQS). EDT in contact with APS and SAQS was allowed to polymerize for 6 minutes. This chemical oxidative polymerization step was repeated multiple times to build the conductive polymer on the surface inside the pores. The anodes were dip-coated using a PEDT slurry (Clevios® K from Heraeus) to form the first layer of an external polymer. They were then immersed in an aqueous solution of 7% sorbitol for 1 minute and dried at 90° C. for 20 minutes. Next they were dip-coated using a PEDT slurry (Clevios® K from Heraeus). Carbon and silver containing conductive coatings were applied as part of the procedure to build terminal links as is known to one skilled in the art. The anodes after carbon and silver coating were cross-sectioned. Multiple points along the conductive polymer layer of the edges and bulk body locations were taken for measuring the thickness of the conductive polymer layer. The averaged thickness values of the bulk body and the edge were listed in Table 1.

Control Example 2

Aluminum anodes were prepared with the same procedure as outlined in Inventive Example 2 except that the polyol precoat was not used. The averaged thickness values of the bulk body and the edge are listed in Table 1.

The experimental data in Table 1 shows that anodes with sorbitol precoat had significantly improved edge coverage.

TABLE 1

Conductive polymer layer thickness on aluminum anodes

| | Body(μm) | Edge(um) | Body/Edge |
|---|---|---|---|
| Control Example 2 | 10.6 | 1.42 | 7.5 |
| Inventive Example 2 | 6.77 | 2.23 | 3.0 |

Corrosion Test

Comparative Example 2

Aluminum anodes were prepared with the same procedure as outlined in Inventive Example 2 except that the precoat was applied using a commercial product, Clevios® K Primer from Heraeus.

Figure 6:
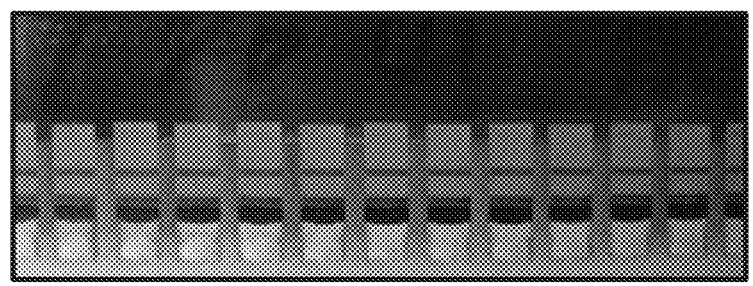
Figure 7:
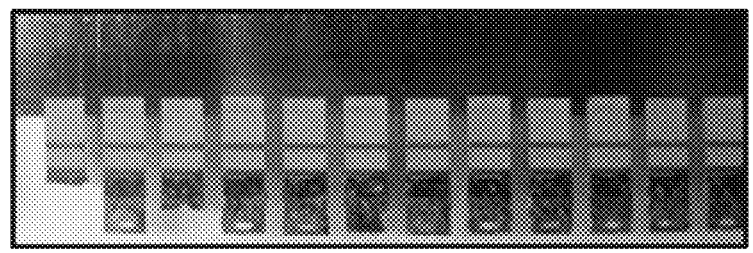

The anodes prepared in the Inventive Example 2 and Comparative Example 2 were placed in a chamber set at 121° C. and 85% RH under 1.76 atm pressure for 21 hours. The rated working voltage of 6.3V was applied to the samples. After this corrosion test samples prepared by the Inventive Example 2 showed no sign of corrosion as shown in FIG. 6 while samples made by the Comparative Example 2 showed severe corrosion as shown in FIG. 6.

The invention has been described with reference to the preferred embodiments without limit thereto. One of skill in the art would realize additional embodiments and alterations which are not specifically stated but which are within the scope of the invention as set forth in the claims appended hereto.

What is claimed is:

1. A method of forming an electrolytic capacitor comprising:
   providing an anode with an anode lead extending therefrom;
   forming a dielectric on said anode;
   forming a conductive polymer layer on said layer of dielectric;
   forming a layer of non-ionic polyol on said conductive polymer layer; and
   forming a second conductive polymer layer on said layer of non-ionic polyol.

2. The method for forming an electrolytic capacitor of claim 1 comprising:
   forming a subsequent layer of non-ionic polyol.

3. The method of forming an electrolytic capacitor of claim 2 comprising forming a subsequent layer of conductive polymer on said subsequent layer of non-ionic polyol.

4. The method for forming an electrolytic capacitor of claim 1 wherein said forming a conductive polymer layer on said layer of dielectric comprises in-situ polymerization.

5. The method for forming an electrolytic capacitor of claim 1 further comprising dipping in a slurry of conductive polymer prior to said forming a layer of non-ionic polyol.

6. The method for forming an electrolytic capacitor of claim 1 wherein non-ionic polyol has a melting point of at least 50° C. to no more than 250° C.

7. The method for forming an electrolytic capacitor of claim 6 wherein non-ionic polyol has a melting point of at least 75° C. to no more than 200° C.

8. The method for forming an electrolytic capacitor of claim 1 wherein said non-ionic polyol comprises an alkyl of 3-20 carbons with at least two carbons each comprising at least one hydroxyl group.

9. The method for forming an electrolytic capacitor of claim 8 wherein at least one carbon is substituted with an alkyl group.

10. The method for forming an electrolytic capacitor of claim 9 wherein said alkyl group has 1 to 5 carbons.

11. The method for forming an electrolytic capacitor of claim 1 wherein said non-ionic polyol is selected from the group consisting of $CH_2OH(CHOH)_2CH_2OH$, $CH_2OH(CHOH)_3CH_2OH$, $CH_2OHC(CH_2OH)_2CH_2OH$, $CH_2OHC(CH_3)_2CH_2OH$, $CH_2OH(CHOH)_4CH_2OH$, $CH_2OH(CHOH)_4CH_2OH$, $CH_3C(CH_2OH)_3$, $O(CH_2C(C_2H_5)CH_2OH)_2)_2$, $CH_2OH(CHOH)_4COH$, $CH_2OH(CHOH)_3COCH_2OH$, sucrose and lactose.

12. The method for forming an electrolytic capacitor of claim 1 further comprising drying said conductive polymer layer.

13. The method for forming an electrolytic capacitor of claim 1 wherein said anode comprises a valve metal.

14. The method for forming an electrolytic capacitor of claim 13 wherein said anode is selected from a group consisting of a valve metal and a conductive oxide of a valve metal.

15. The method for forming an electrolytic capacitor of claim 13 wherein said anode comprises a material selected from the group consisting of tantalum, aluminum, niobium and niobium oxide.

16. The method for forming an electrolytic capacitor of claim 1 wherein said conductive polymer is selected from the group consisting of polyaniline, polythiophene and polypyrole and their derivatives.

17. The method for forming an electrolytic capacitor of claim 16 wherein said conductive polymer is poly-3,4-ethylenedioxythiophene.

18. The method for forming an electrolytic capacitor of claim 1 further comprising forming a layer of nanoparticles on said conductive polymer layer.

19. The method for forming an electrolytic capacitor of claim 18 wherein said nanoparticles have an average particle size of no more than 100 nm.

20. The method for forming an electrolytic capacitor of claim 19 wherein said nanoparticles have an average particle size of no more than 50 nm.

21. The method for forming an electrolytic capacitor of claim 18 wherein said nanoparticles are selected from the group consisting of aluminum oxide, cerium oxide silicon oxide and zinc oxide.

* * * * *